United States Patent [19]
Wagener et al.

[11] Patent Number: 5,187,475
[45] Date of Patent: Feb. 16, 1993

[54] APPARATUS FOR DETERMINING THE POSITION OF AN OBJECT

[75] Inventors: Thomas J. Wagener, Eden Prairie; Paul E. Bjork, Forrest Lake; James E. Lenz, Brooklyn Park, all of Minn.

[73] Assignee: Honeywell Inc., Minneapolis, Minn.

[21] Appl. No.: 712,863

[22] Filed: Jun. 10, 1991

[51] Int. Cl.⁵ .............................................. G01B 7/00
[52] U.S. Cl. .......................... 340/870.32; 324/207.11; 324/207.13
[58] Field of Search ...................... 340/870.31, 870.32, 340/870.33; 324/207.11, 207.12, 207.13, 207.14, 207.15, 207.22, 225, 243, 260; 336/45, 179

[56] References Cited

U.S. PATENT DOCUMENTS 4,785,242 11/1988 Vaidya et al. ................... 340/870.32
5,045,785 9/1991 Hansen ............................ 324/207.22

Primary Examiner—Donald J. Yusko
Assistant Examiner—Michael Krakovsky
Attorney, Agent, or Firm—William D. Lanyi

[57] ABSTRACT

A position sensor is provided which incorporates the first and second magnetic members which are attached to an object whose position is to be determined. First and second magnetic sensors are disposed at positions in association with the two magnetic members. As the object moves along a predetermined path, the first and second magnetic members dispose a predetermined amount of magnetic material in the zones of the two sensors. By measuring the changing impedance of the winding of one of the sensors and comparing that value to the impedance of the winding of the other sensor, corrections can be made to determine the position of the object notwithstanding the fact that external effects may have changed the conditions under which the measurements are being taken. For example, gaps between the magnetic members and the sensors can possibly change from one time to another or the ambient temperature surrounding the sensors and the magnetic members could have changed. By comparing the values of the two sensor readings, these variabilities can be factored out of the determination and the accurate position of the object can be measured.

20 Claims, 12 Drawing Sheets

APPARATUS FOR DETERMINING THE POSITION OF AN OBJECT

BACKGROUND OF THE INVENTION

1. Field of the Invention

The present invention relates generally to the field of sensors for determining the position of an object and, more particularly, to an apparatus which uses magnetic sensors in cooperation with two magnetic components which can be combined as a single element or employed as separate elements that are attached to the object whose position is being sensed, wherein one of the magnetic components provides a reference signal that is used to correct for changes in condition which do not directly relate to movement of the object being sensed.

2. Description of the Prior Art

Many techniques for determining the position of an object are available to those skilled in the art. For example, simple systems can utilize limit switches to determine when a moving object reaches a particular predetermined position in space. To define the position of a moving object with more specificity, LVDT's or RVDT's can be used.

U.S. Pat. No. 4,707,695, which issued to Takahashi et al. on Nov. 17, 1987, discloses a magnetic position sensor that provides a detector for receiving a reference position signal in movement from an encoder track and a reference track arranged on a member included in a magnetic position sensor. It also comprises magnetic pick ups respectively confronting to the encoder track and the reference track. Both tracks jointly yield a position reference signal.

Those skilled in the art are also familiar with resolvers or rotation counters which can be used in situations where rotatable shafts are associated with the movement of an object to be monitored. Depending on the particular application, each type of position determining system provides certain advantages or disadvantages. For example, a particular application may require the position monitoring system to undergo severe changes in temperature or pressure. Other circumstances may require a minimum of moving parts because of exposure to adverse elements which would be captured between moving parts.

SUMMARY OF THE INVENTION

The present invention provides a system for determining the position of an object. It includes at least two sensors, such as magnetic coils, which are disposed proximate the object whose position is to be determined. Attached to the object, according to a preferred embodiment of the present invention, are two magnetic members. One magnetic member is associated with each of the sensors of the present invention which are, in turn, configured to provide a signal responsive to the presence of a magnetic material proximate that sensor. More particularly, in a preferred embodiment of the present invention, the sensors are magnetic coils that are configured to provide a signal that is indicative of the presence of magnetic material within a particular zone, or region, proximate the sensor. Throughout the description of the present invention, the magnetic members will be described as being attached to the object being measured but it should be understood that they could alternatively be part of the object. One of the magnetic members attached to the object has a first length defined along a first axes and a first cross sectional area measured generally perpendicular to the first axes. The second magnetic member is also attached to the object and has a second length defined along a second axes. The second magnetic member also has a second cross sectional area that is generally perpendicular to the second axes. Both magnetic members are associated with the object to move along the first and second axes, respectfully, in response to the movement of the object which is to be measured. Both magnetic members are shaped to cause their associated sensors to provide signals with relative magnitudes whose relationship is uniquely related to the position of the object. In one particularly preferred embodiment of the present invention, the lengths of the first and second magnetic objects are generally equal to each other while the cross sectional area of only the second magnetic member varies as a function of its length. In another embodiment of the present invention, the two magnetic members are of different lengths. In addition, in the preferred embodiment of the present invention which varies the cross sectional area of the second member as a function of its operative length, the cross sectional area can be varied by either maintaining a constant height while varying the width of the magnetic member or, alternatively, by maintaining a relatively constant width and varying the height of the magnetic member. In all of the preferred embodiments of the present invention, one of the two magnetic members is used as a reference to allow the present invention to accurately measure the position of an object even though some conditions have changed, other than the position of the object being measured. For example, if the measured object moves in a direction other than that which is being measured, the reference magnetic member permits the present invention to correct for that external change. Similarly, changes in temperature can be accommodated by the present invention because of the existence of the reference magnetic object.

Although the preferred embodiments of the present invention are described as comprising two or more magnetic components, it should be understood that alternative embodiments could use only one magnetic component which is shaped to cause the associated sensor to provide a signal which varies according to a predefined relationship with an object's position. This alternative embodiment is most appropriate in circumstances where other conditions, such as the gap between the magnetic component and the sensor, are not expected to change.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
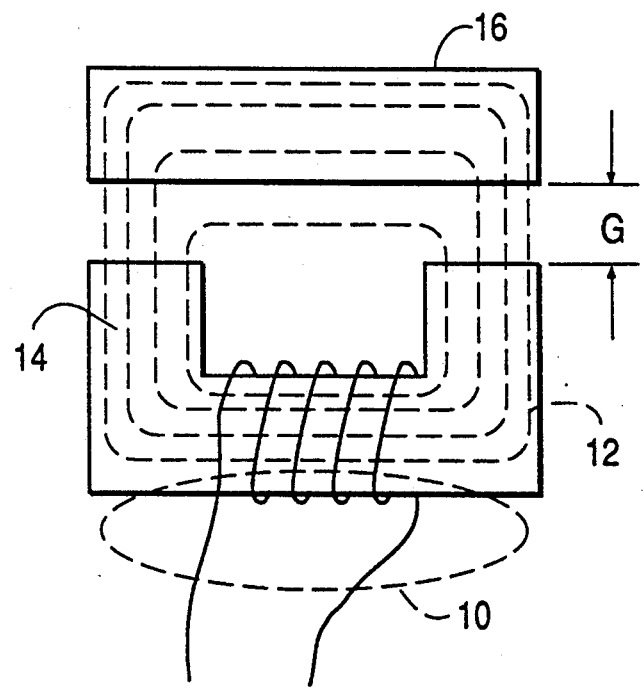
FIG. 1 illustrates a typical magnetic sensor incorporating a core and a winding.

Throughout the description of the preferred embodiment, like elements will be identified with like reference numerals.

The present invention relates generally to an apparatus for sensing the position of an object. In a most preferred embodiment of the present invention, a plurality of magnetic sensors are used. In one particular embodiment, the sensors comprise magnetic coils which are associated with apparatus that is configured to determine the impedance (which includes both resistance and inductance) through a winding of the magnetic coil. The impedance of the winding changes as a function of the presence of magnetic material within a predetermined zone, or region, proximate the coil. With reference to FIG. 1, this principle is based on the fact that the impedance of a winding 10 of a magnetic coil 12 will change as a function of the quantity of magnetic material within a zone proximate the coil. For example, the coil in FIG. 1 comprises a magnetic core 12 and a winding 10 associated with the core. Current passing through the winding 10 creates a magnetic field which is represented by the dashed lines 14 in FIG. 1. If a piece of magnetic material 16 is disposed in a zone where the lines of magnetic flux exist, the magnetic material 16 provides a more efficient path for the flux. If no magnetic material 16 is present in the zone proximate the magnetic coil, the lines of flux must pass through air to complete the magnetic circuit. Since the permeability of a magnetic material, such as steel, can be as much as one thousand or more times the permeability of air, the impedance of the winding 10 will change significantly as the amount of magnetic material 16 in the zone changes. The specific techniques used to measure the resistance of the winding 10 will not be described herein in great detail because these techniques are well known to those skilled in the art and do not limit the scope of the present invention. Briefly stated, a constant AC current can be caused to flow through winding 10 while the voltage across the winding is measured. Changes in the voltage will indicate changes in the impedance of the winding 10 which, in turn, will indicate changes in the amount of magnetic material 16 located in the zone proximate the coil. As the amount of magnetic material in the zone increases, the magnetic material will provide a lower reluctance flux path for the magnetic flux. The key element in these types of magnetic sensor systems relies on changes in the reluctance of the flux path. If no magnetic material 16 is present in the zone proximate the sensor, the magnetic flux will experience significate difficulty in completing its circuit because of the relatively low permeability of air. As magnetic materials 16 is introduced into the zone, the reluctance of the flux path is lowered and the impedance through winding 10 is therefore increased.

With continued reference to FIG. 1, it should be understood that the gap G between the magnetic material 16 and the core 12 can have a measurable effect on the efficiency of the flux path and, therefore, on the impedance in the winding 10. Therefore, if the magnetic sensor shown in FIG. 1 is to be used in an accurate measurement system, the gap G must either be known or accounted for. The present invention is directed to providing a position monitoring system which accounts for variations such as the dimension of gap G.

Figure 2:
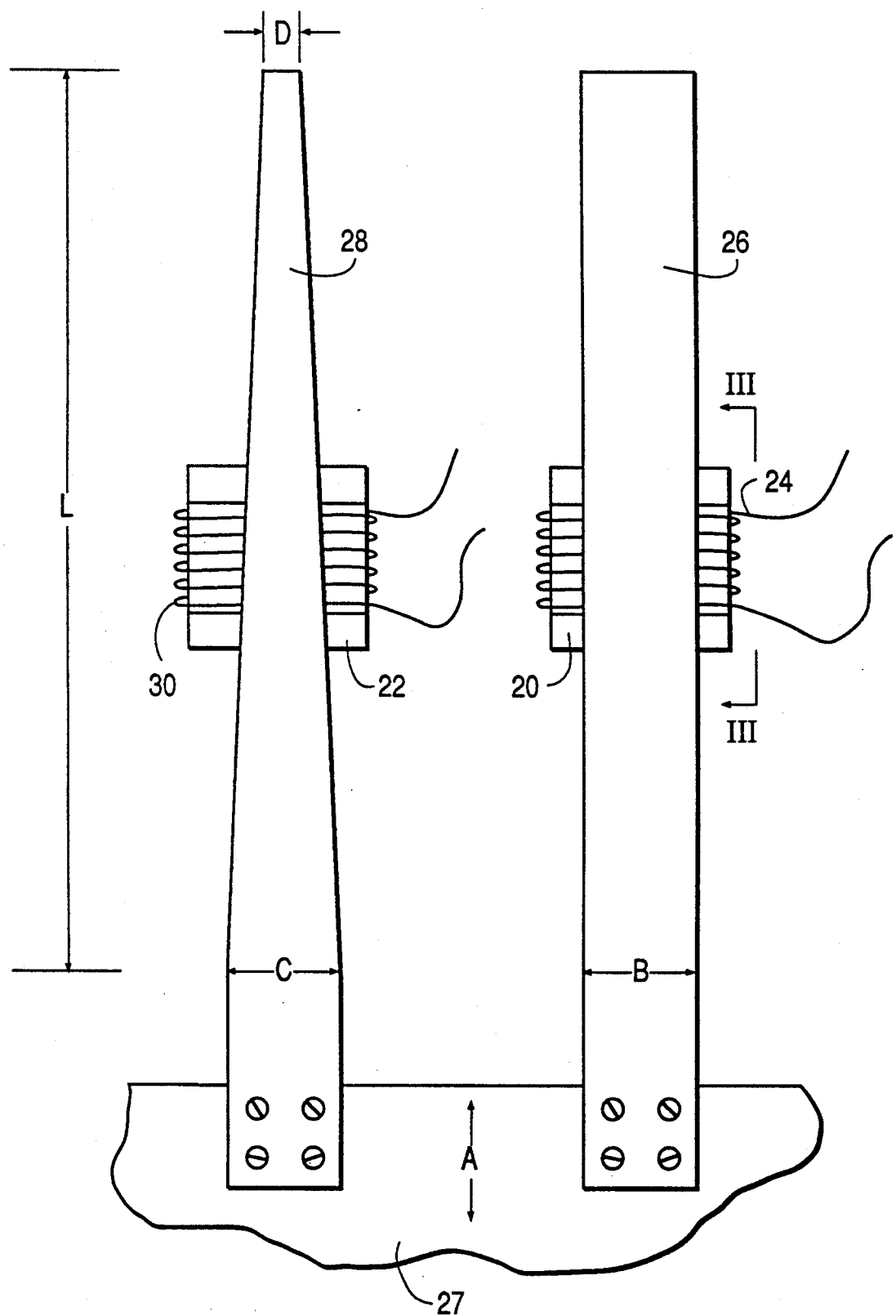
FIG. 2 illustrates one preferred embodiment of the present invention.

FIG. 2 illustrates one alternative embodiment of the present invention. It provides a first sensor 20 and a second sensor 22. The first sensor 20 is configured to provide a first signal that is responsive to the presence of the magnetic material proximate the first sensor 20. A winding 24 is associated with the first sensor 20 as shown in FIG. 2. Although not shown in FIG. 2, the winding 24 is connectable to a circuit designed to measure the impedance of the winding. As described above in conjunction with FIG. 1, several techniques are available to those skilled in the art to measure the impedance of the winding 24. Associated with the first sensor, a first magnetic member 26 is attached to an object whose position is to be determined by the apparatus. In FIG. 2, reference numeral 27 is used to identify the object. The first magnetic member 26 is attached to the object 27 as shown. As the object moves in the direction indicated by arrow A, the first magnetic member 26 moves in a similar direction because of its attachment to the object 27.

A second magnetic member 28 is also attached to the object 27. Both the first 26 and second 28 magnetic members have an operative length L measured in a direction defined along the axes of the first and second magnetic members. The axes of both magnetic members are generally parallel to the direction of travel indicated by arrow A.

The first magnetic member 26 has a generally constant cross sectional area measured perpendicular to the first axes. In FIG. 2, the width of the first magnetic member 26 is identified by reference letter B. As can be seen, the width of the first magnetic member 26 is generally constant along its entire operative length L. As can also be seen in FIG. 2, the width of the second magnetic member 28 varies as a function of its position along the second axes. For example, dimension C is illustrated as being measurably larger than dimension D. If the thickness of the first and second magnetic members is generally constant throughout their operative lengths, the change in width from dimension C to dimension D will result in a changing quantity of magnetic material disposed within the zone of the second sensor 22 as the object, and both the first and second magnetic members, move back and forth in the directions indicated by arrow A. More specifically, if the object 27 moves downward in FIG. 2, the stationary second sensor 22 will have a smaller quantity of magnetic material disposed within its zone as that movement of the object 27 continues. On the other hand, if the object 27, and both of the attached magnetic members, move upward in FIG. 2 the thicker portions of the second magnetic member 28 will be moved into the zone of the second sensor 22. As the amount of magnetic material in the zone changes, the impedance of the winding 30 of the second sensor 22 will change and can be measured as an indication of the amount of magnetic material in the zone of the second sensor. As can be seen in FIG. 2, a signal which represents the amount of magnetic material in the zone of the second sensor 22 also will be indicative of the position of the second magnetic member 28 and, therefore, will also be indicative of the position of the object 27. Because of the fact that the first magnetic member 26 is generally constant in cross sectional area, changes in the position of the object 27 along the path in the directions of arrow A will not have an effect on the impedance of winding 24. Therefore, if all other environmental effects remain constant, the impedance of winding 24 will remain constant. This characteristic permits the first sensor 20 to be used as a reference which enables the apparatus to determine whether or not changes have occurred in the circumstances surrounding the measurement device. In other words, as the temperature of the apparatus changes, both sensors will be affected by the temperature change and this change can be sensed in the impedance of winding 24. If such a change is detected, the signal received from the second sensor 22 can be modified according to a predetermined correction factor. Similarly, if the entire apparatus moves away from the first and second sensor, in a direction out of the page of FIG. 2, a change will be detectable in the impedance of winding 24 and a similar correction can be made. Therefore, it can be seen that the provision of the first magnetic member 26 permits a measuring apparatus to correct for changes which occur to the system, but which do not directly relate to movement of the object 27 in the directions indicated by arrow A.

Figure 3:
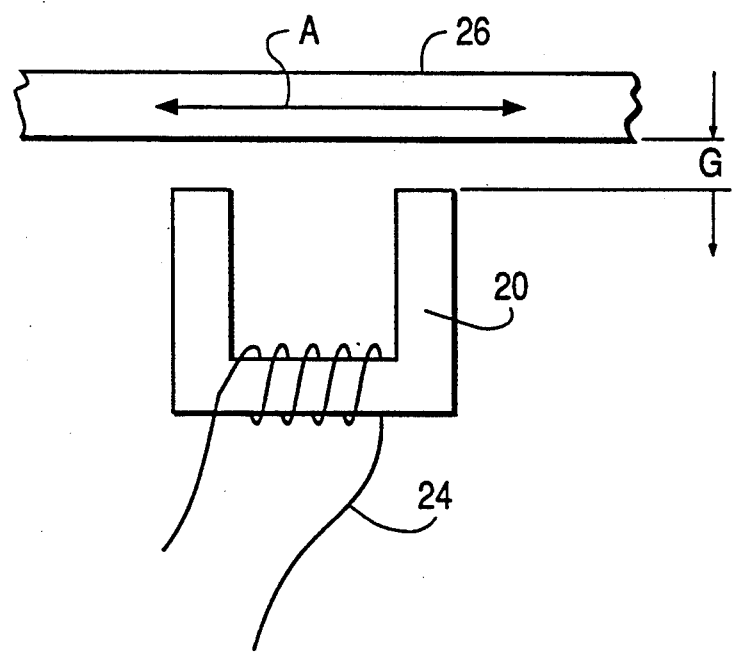
FIG. 3 illustrates a sectional view of the device shown in FIG. 2.

FIG. 3 illustrates a sectional view of FIG. 2 which shows the first sensor 20 and its winding 24 in association with the first magnetic member 26. As can be seen, the first sensor 20 is disposed below the first magnetic member 26 and a gap G exists between them. As described above in association with FIG. 1, lines of flux pass through the air gap G and into the first magnetic member 26 which completes the magnetic circuit. As gap G increases because of an overall movement of the object 27 and both of its attached magnetic members or, alternatively, because the pair of sensors moves away from the first and second magnetic members, the reluctance of the magnetic flux path will change. This results in a change in the resistance of winding 24. Since a change in the impedance of winding 24 is known to have not been caused by movement along arrow A since the cross sectional area of the first magnetic member 26 is constant, it can be deduced that the change in winding impedance must have been caused by external causes such as a change in the dimension of gap G or, alternatively, a change in temperature surrounding both sensors. As will be described below in greater detail, corrections can be made to the readings received from the second sensor 22 when changes in the winding 24 of the first sensor 20 are detected because of the reference signal provided by the first sensor 20. The DC resistance of the coil winding can be used as a temperature indication in situations requiring that gap and temperature effects be determined separately.

Figure 4:
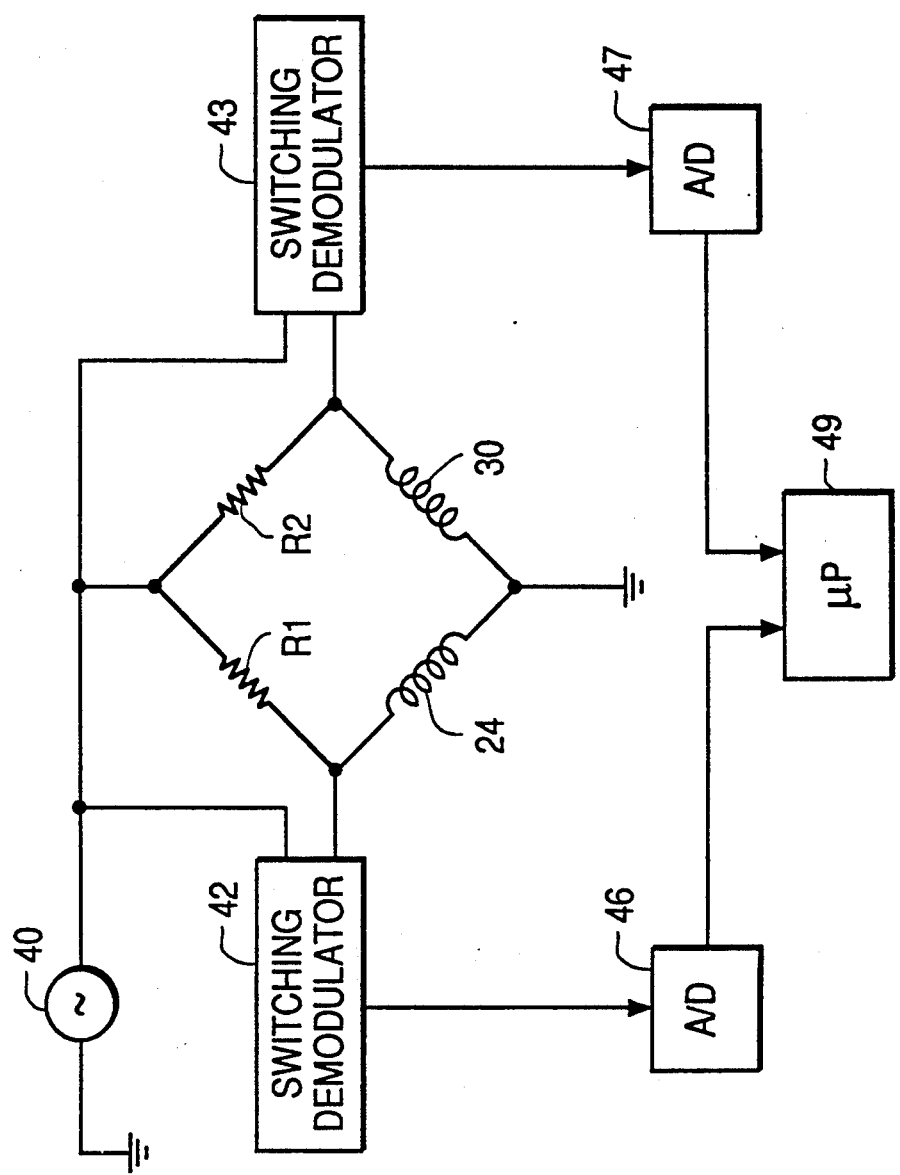
FIG. 4 illustrates an exemplary electrical circuit that can be used in association with the embodiment shown in FIG. 2.

Although many different types of measuring systems can be used in accordance with the present invention, FIG. 4 shows one particular system that is suitable for use in association with the present invention. A power source 40 is used to provide an alternating current to both the first winding 24 and the second winding 30. By using switching demodulators 42 and 43, the voltage drops across resistors R1 and R2 can be measured. Those voltage drops are then converted from analog to digital information by the analog-to-digital converters 46 and 47 and the resulting information is provided to a computer 49. As can be seen in the circuit of FIG. 4, changes in the impedance of the first winding 24 or the second winding 30 can be determined by measuring the voltage drop across there associated resistors, R1 and R2, respectfully. As described above, these changes in the impedance of the windings of the sensors will indicate the amount of magnetic material disposed within their respective zones. It should be recognized that alternative circuits, other than the one shown in FIG. 4, can be used to measure the resistance or reactance of the first and second sensors.

Throughout the description of the preferred embodiment of the present invention, the magnetic material has been discussed as being within the zone of one of the sensors. This terminology refers to the area proximate the sensor in which magnetic material will assist the completion of the magnetic circuit as described above in association with FIG. 1. It is recognized that the zone will vary as a function of the magnitude of current passing through the winding of the sensor and will also vary as a function of other characteristics which affect the efficiency of operation of the sensor. However, those skilled in the art will appreciate that there is a region proximate the magnetic sensor in which the presence of a magnetic material will measurably affect the impedance of the sensor winding in such a way that it can be measured as an indication of the existence of magnetic material in that zone.

In the discussion below, the effect of magnetic material in the zone of a sensor will be described in terms of its millivolt output or, alternatively, the sensor output. It should be understood that the sensor output is a function of the impedance of its associated winding. Whether the output is expressed in ohms, milliamperes or millivolts, it expresses the magnitude of impedance in the winding. As those skilled in the art will understand, passing a constant current through the winding will result in a reading expressed in millivolts, whereas maintaining a constant voltage across the winding will result in a reading expressed in milliamperes. Either of these techniques can also yield a magnitude measured in ohms.

Figure 5:
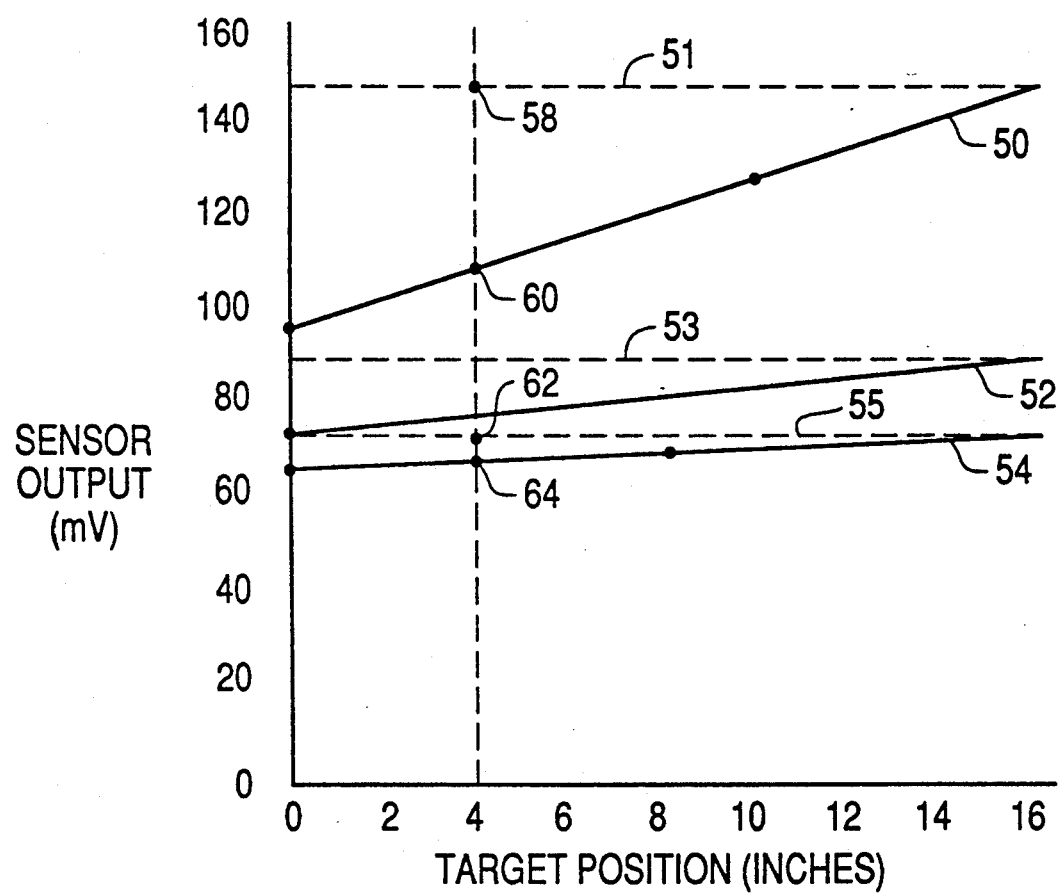
FIG. 5 is a graphical representation of signal magnitudes from the first and second sensors of the present invention at various magnitudes of gap between the sensors and their associated magnetic members.

Before describing the graphical representation of FIG. 5, it should be understood that one particularly preferred embodiment of the present invention incorporates first and second magnetic members which have an operative length of 16 inches. Furthermore, in that preferred embodiment of the present invention, dimension D in FIG. 2 is 0.2 inches and dimension C in FIG. 2 is 1.0 inches. The thickness of both the first and second magnetic members, 26 and 28, is 0.109 inches. Although several widths of the first magnetic member could have been used, dimension B in FIG. 2 is 1.0 inch in a preferred embodiment of the present invention.

With reference to FIG. 5, graphical representations of the sensor output are shown as a function of target position. It should be understood that at target position zero the smaller dimension of the second magnetic member 28 is disposed in the zone of the second sensor 22. Therefore, as illustrated by line 50 in FIG. 5, the millivolt signal representing the impedance of winding 30 rises as the amount of magnetic material in the zone of the second sensor 22 decreases. This decrease in magnetic material is caused by movement of the object 27 in a downward direction in FIG. 2. Dashed line 51 represents the corresponding signal which is indicative of the impedance of winding 24 of the first sensor 20. Since the cross sectional area of the first magnetic member 26 is generally constant along its entire operative length L, the sensor output corresponding to the first sensor 20 is normally constant as indicated by horizontal line 51. By comparing the relationship of the signal values represented by lines 50 and 51, the apparatus of the present invention can determine the target position indicated by those values.

As discussed above in conjunction with FIGS. 1 and 3, a change in the gap between the sensor and the magnetic member can change the impedance of the associated winding. This will change the magnitude of the sensor output even if the object 27 does not move in the direction indicated by arrow A. For example, line 50 in FIG. 5 indicates the relative signals expected from the sensor output if gap G is 0.25 inches. Dashed line 51 represents the corresponding signal from the reference sensor if the same gap of 0.25 inches exists its first magnetic member and its first sensor. Line 52 in FIG. 5 represents the sensor output if the gap G increases to 0.5 inches. Similarly, dashed line 53 indicates the sensor output from the reference, or first, sensor 20 in FIG. 2. Line 54 represents the sensor output if the gap G increases to 0.75 inches. Accordingly, dashed line 55 represents the output from the reference sensor. In all cases, the lines 50–54 in FIG. 5 represent sensor outputs for various gaps between the magnetic members and their associated sensors as a function of the position of the object 27.

It should be apparent that the relationships between the sensor output for the first and second sensors, such as lines 50 and 51, can be compared to determine the position of the object as a function of the relationship signals from the first and second sensors. It should also be apparent that if gap G changes and the relationship between the first and second sensors is defined by some other pair of lines, such as lines 52 and 53 in FIG. 5, a slightly different relationship will exist between the values obtained from the two sensors. For a particular embodiment of the present invention, the relationship between the reference signals, such as those represented by lines 51, 53 or 55, and the magnitude of the sensor output associated with the second sensor, such as those represented by lines 50, 52 and 54, have been normalized to provide a value which is more easily used to determine the position of the target, or object 27. The equation provides a mathematical relationship between the signals received from the first and second sensors and the position of the object 27. That relationship is defined as $$P = K_1 \times \left[ \frac{(S_V - S_0) - (S_{REF} - S_0)/K_2}{(S_{REF} - S_0) - (S_{REF} - S_0)/K_3} \right]$$

where P represents the mathematical relationship or magnitude that is indicative of the position of the object 27, $S_v$ represents the sensor output from the second sensor 22 in FIG. 2, $S_{REF}$ represents the signal received from the first sensor 20 in FIG. 2, $S_0$ represents a predetermined offset value that is mathematically determined for a particular application and $K_1$, $K_2$ and $K_3$ are constants. The most preferred embodiment of the present invention, $K_1$ is equal to 16.0 so that the value of P is generally equal to the position of the sensed target. Also, in a preferred embodiment of the present invention $K_2$ and $K_3$ are equal to each other and set to 2.606 in the equation. This equation allows the sensor outputs for the first and second sensors to be compared in a way which is independently from the variations that may occur in the magnitude of gap G between the magnetic members and their respective sensors. The provision of a reference signal by the first sensor of the present invention allows the position of the object to be determined in a manner which is independent from the movement of the object in directions other than that intended to be determined. With continued reference to FIG. 5, an example of the value of the present invention will be described. If the gap G between the sensors and their associated magnetic members is 0.25 inches and the target position is at 4 inches, the first and second sensor outputs will correspond to the points identified by reference numerals 58 and 60, respectively, in FIG. 5. In other words, the 4 inch position of the target will cause the first sensor output to be equal to that represented by point 58 and the second sensor will provide an output represented by point 60. If the dimension of gap G suddenly increases to 0.75 inches, the signal outputs from the first and second sensors will change to those indicated by reference numerals 62 and 64, respectively. Since both signals changed according to a predetermined ratio, the relationship between the two signals can be used to determine the position of the object 27. The relationship is defined by the equation shown above.

Figure 6:
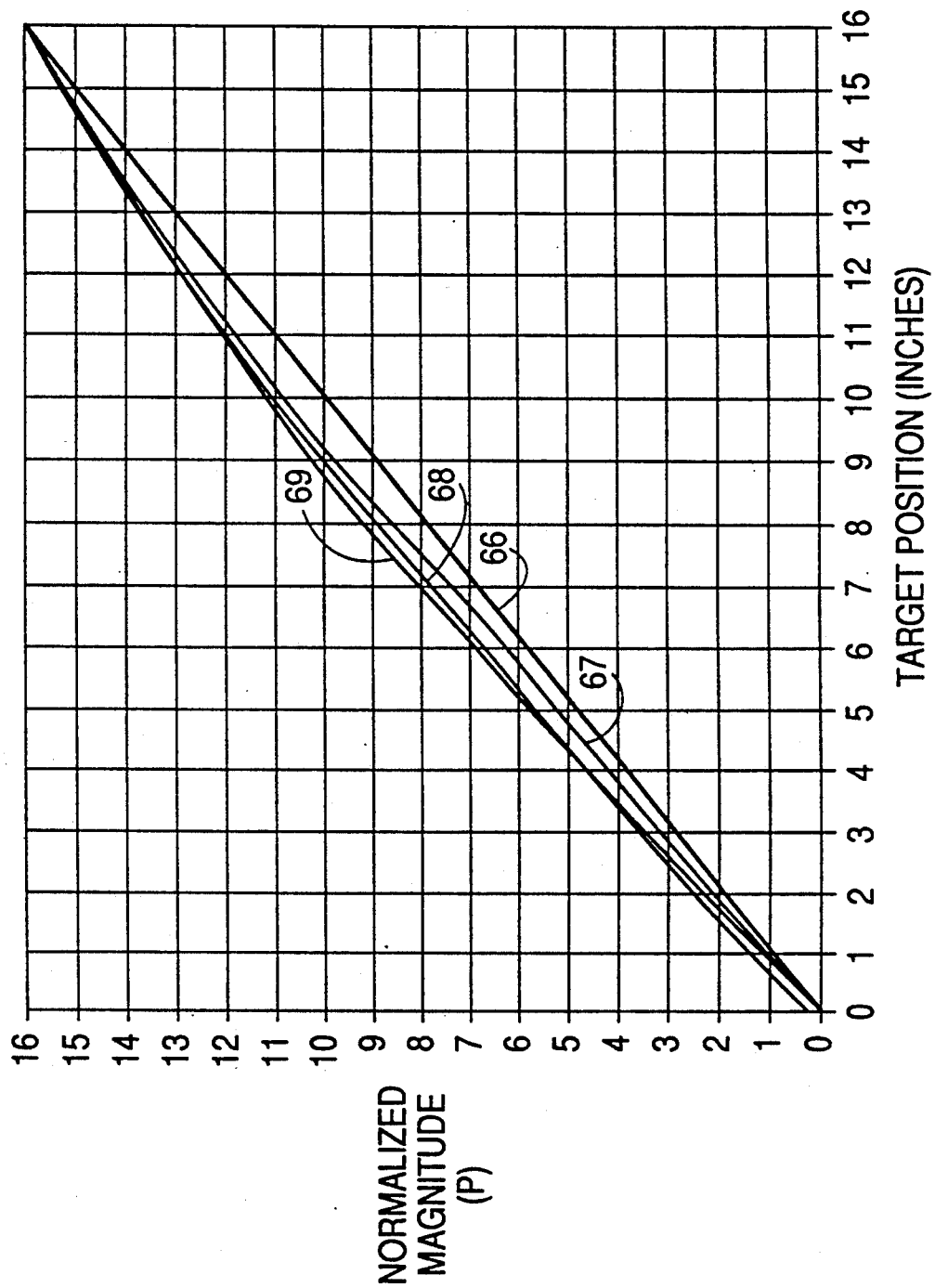
FIG. 6 is a graphical representation comparing a normalized magnitude P with target position for various magnitudes of gap.
Figure 7:
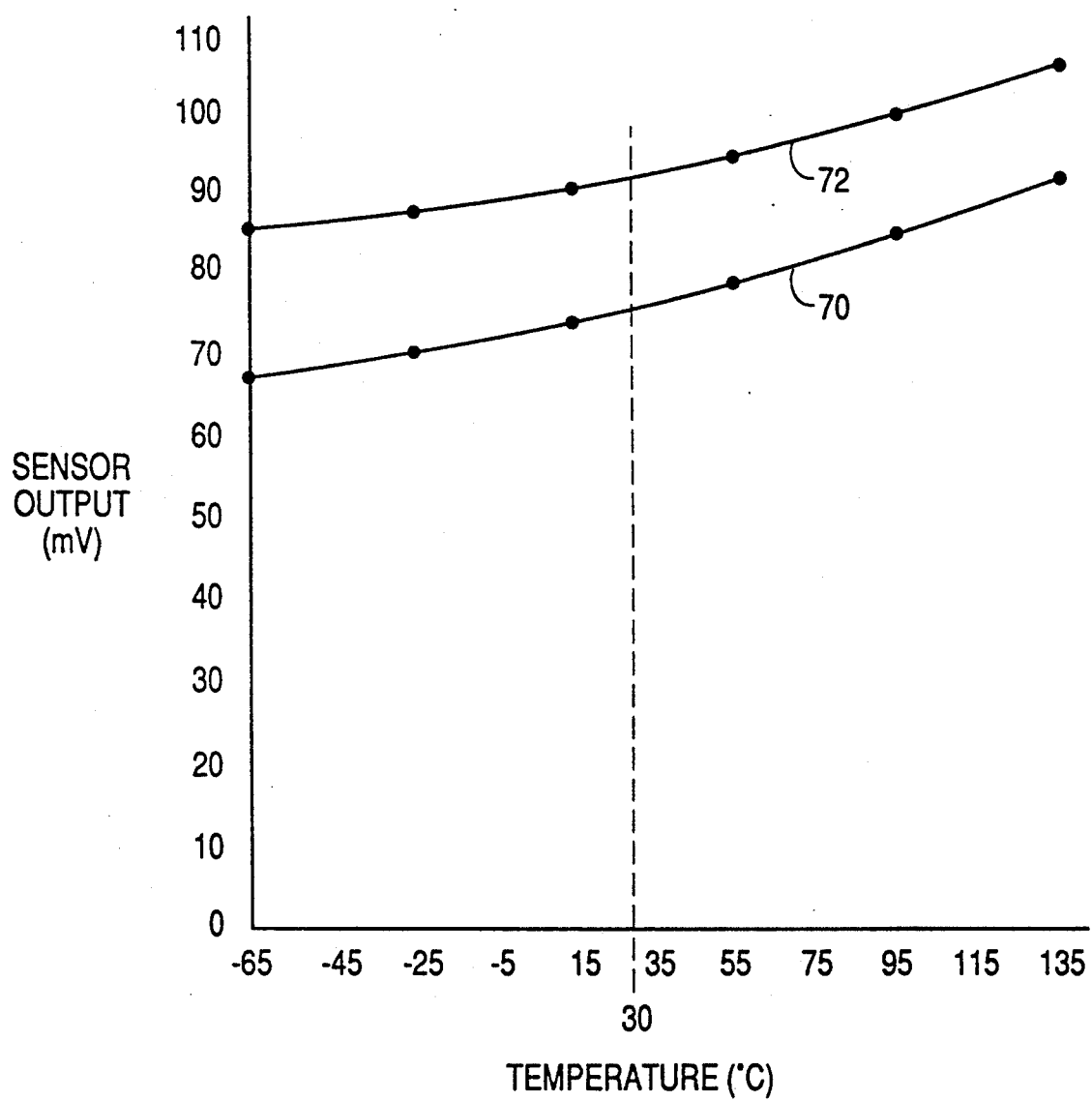
FIG. 7 illustrates empirical data that relates sensor output to temperature.

FIG. 6 illustrates the relationship between the normalized magnitude P, which is calculated according to the equation described above, and the target position measured in inches. The relationship described by the above equation, which determines a normalized magnitude P, exhibits a slight nonlinearity which changes as a function of the magnitude of the gap G. FIG. 6 illustrates the relationship between the actual target position and the magnitude of the calculated normalized magnitude which varies as a function of $S_V$ and $S_{REF}$. Line 66 in FIG. 6 represents perfect linearity between target position and normalized magnitude P. Line 67 represents the result of calculating P with values determined while the gap G is equal to 0.25 inches. Similarly, line 68 represents values of P determined with a gap G which is equal to 0.5 inches. Lastly, line 69 in FIG. 6 represents values of the normalized magnitude P which are calculated using measurements determined while the gap G is equal to 0.75 inches. Although the equation for the normalized magnitude P varies slightly from perfect linearity, it should be understood that these results permit the position of the object 27 to be measured with acceptable accuracy for most applications. In addition, where increased accuracy is required, a lookup table can be stored in a microprocessor which contains values that have been predetermined for the particular application. Those stored values can account for the nonlinearity and allow the system to react appropriately to changes in the normalized magnitude P by correcting for the nonlinearity based on measurements taken during the setup of the apparatus and initial calibration procedures. FIG. 7 illustrates the sensor output as a function of temperature. Line 70 represents empirical data taken with the narrow end of the second magnetic member 28 disposed in a zone of the sensor. Line 72 represents values of sensor output taken with the wider width C of the second magnetic member disposed in the zone of the sensor. It should be clearly understood that the results in FIG. 7 are empirical and based on relatively few samples. Therefore, the results in FIG. 7 represent only an approximation of the effects of temperature on the signal output.

Figure 8:
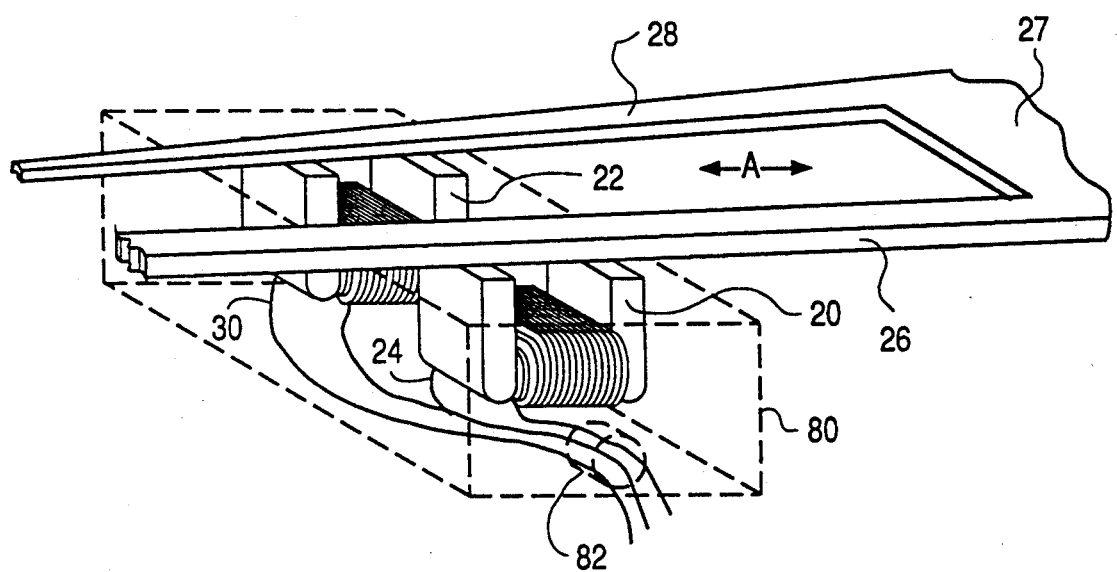
FIG. 8 shows a respective view of one embodiment of the present invention.

FIG. 8 illustrates an embodiment of the present invention which disposes the first and second sensors within a containment 80 which is represents by dashed lines. The perspective view of FIG. 8 shows that the first and second sensors, 20 and 22, can be incorporated in a single structure. As can be seen in FIG. 8, the leads from the windings 24 and 30 are brought out through a connector 82 and can therefore be associated in signal communication with the circuitry necessary to compute the calculations described above. It should be understood that the illustration of FIG. 8 represents only on particular embodiment of the present invention and does not limit the scope of the present invention.

Figure 9:
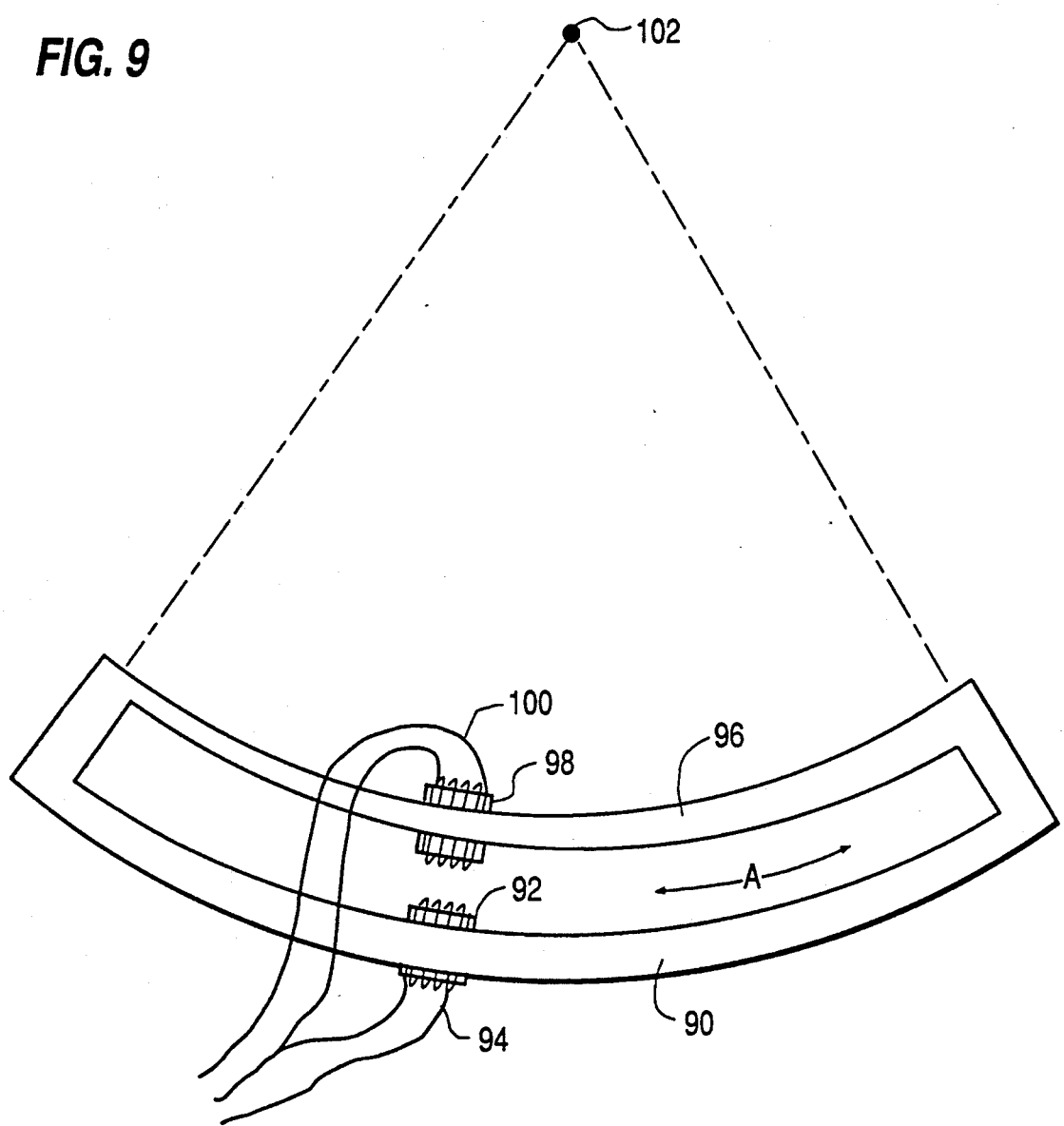
FIG. 9 illustrates an alternative embodiment of the present invention adapted for use in the measurement of curvelinear motion of an object.

When the present invention is adapted for use in association with apparatus which must measure curvelinear motion, it can be configured as shown in FIG. 9. A first magnetic member 90 is associated with a first sensor 92 that has a first winding 94. A second magnetic member 96 is associated with a second sensor 98 which has a second winding 100. The device shown in FIG. 9 can be attached to an object whose movement is to be determined. In FIG. 9, the exemplary device is intended for movement along a curvelinear path about point 102 as indicated by arrow A in FIG. 9. The operation of the present invention when configured as shown in FIG. 9 is similar to its operation in association with a device such as that shown in FIG. 2. As the device moves along the path represented by arrow A, the second sensor 98 has changing amounts of magnetic material disposed within its zone by the second magnetic member 96 while the first sensor 92 experiences a relatively constant amount of magnetic material within its zone because of the generally constant cross section of the first magnetic member 90 which operates as a reference.

Figure 10:
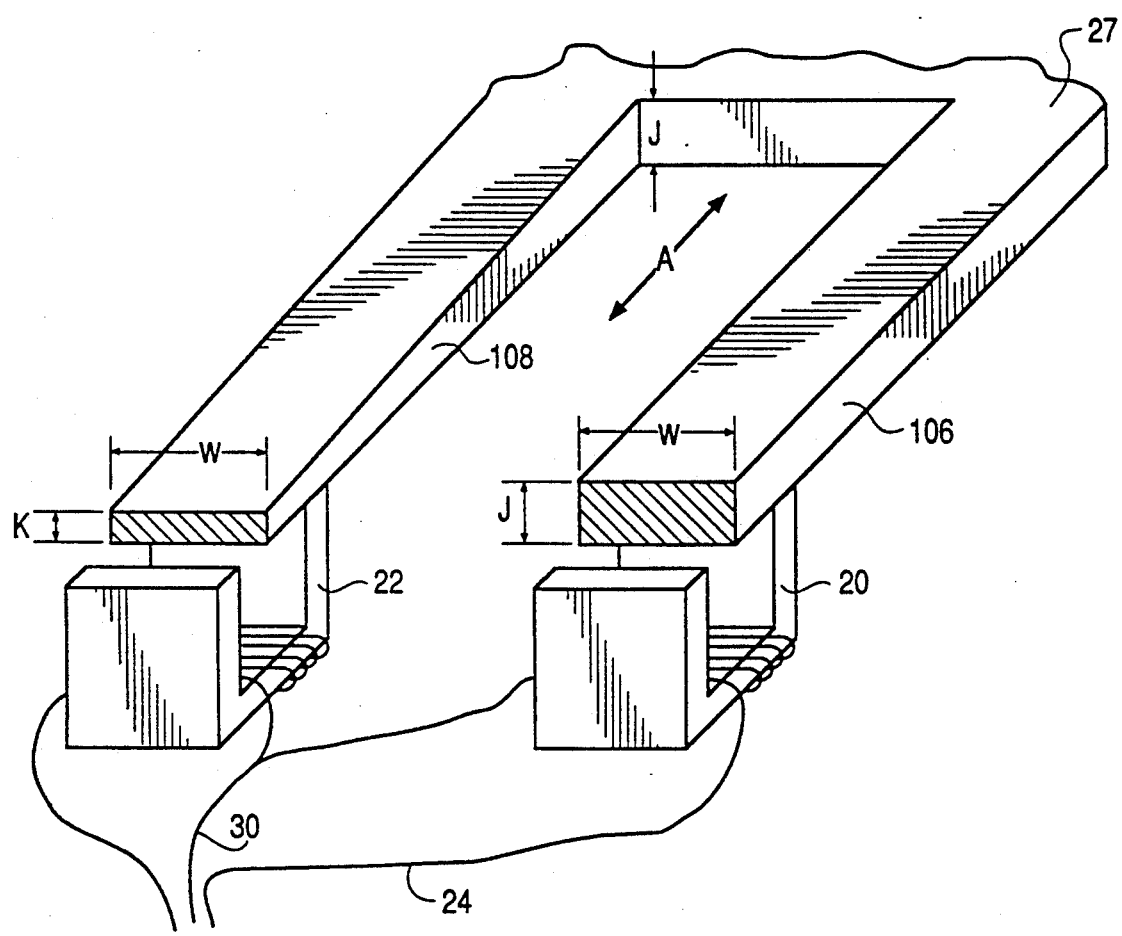
FIG. 10 shows an alternative embodiment of the present invention which varies the thickness of a magnetic member rather than its width.
Figure 11:
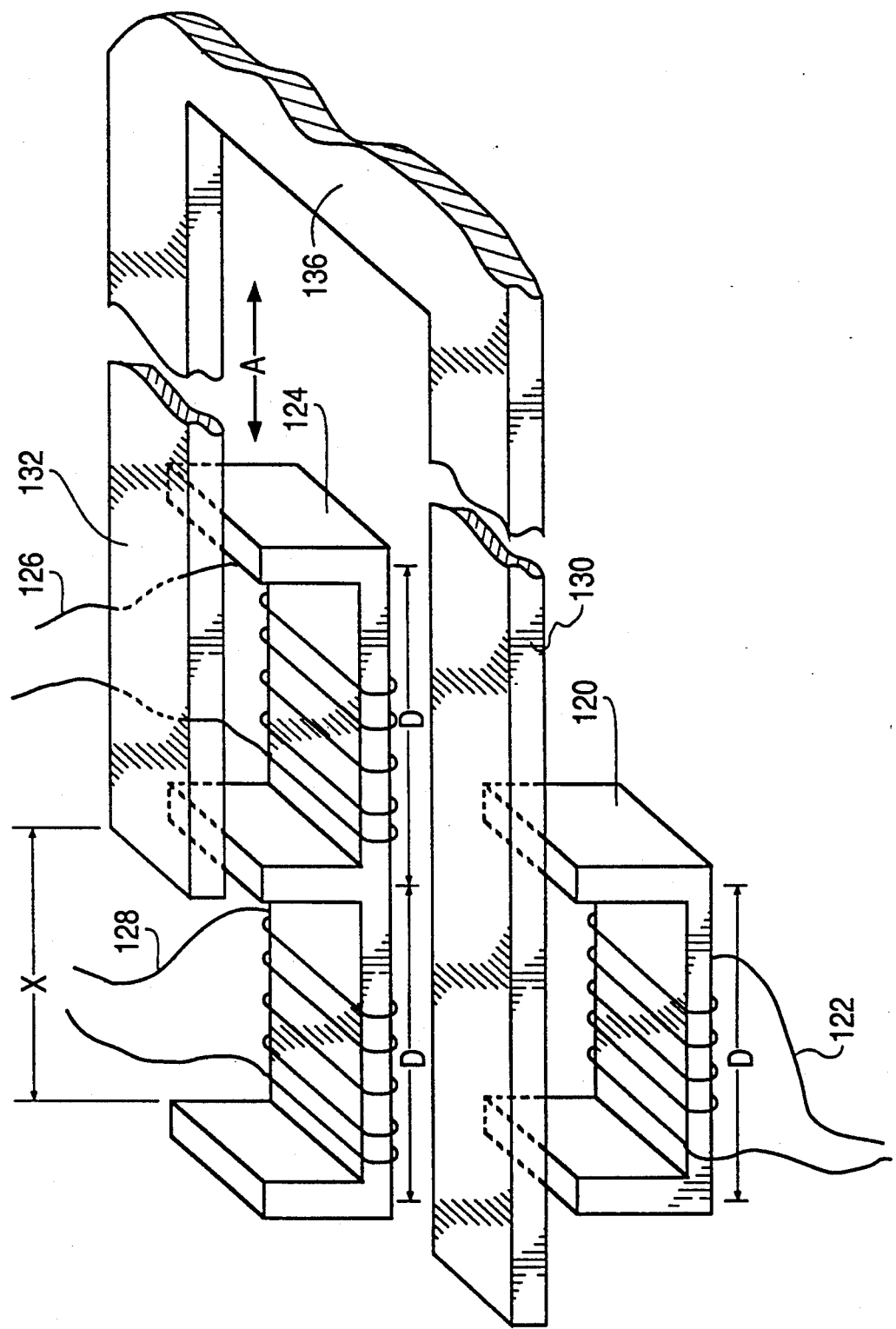
FIG. 11 shows an alternative embodiment of the present invention which varies the length of the magnetic members rather than their cross sectional areas.

FIG. 10 illustrates a slightly different embodiment of the present invention. While the first and second sensors, 20 and 22, and the first and second windings, 24 and 30, are generally similar to that described above in conjunction with FIG. 2, the first and second magnetic members are slightly different. For example, while the widths W of the two magnetic members are generally equal to each other and generally constant along their length, their thicknesses are measurably different. As can be seen in FIG. 10, thickness J of the first magnetic member 106 is constant along its length while the thickness of the second magnetic member 108 varies along its length. For example, the thickness K of the portion of the second magnetic member 108 which is disposed in the zone of the second sensor 22 is illustrated as being significantly less than dimension J which indicates the thickness of the opposite end of the second magnetic member 108. As the object to be measured moves in a direction indicated by arrow A, the thickness of the second magnetic member 108 disposed in the zone of the second sensor 22 will change. This, in turn, will change the impedance of the winding 30 in a way which permits it to be measured as an indication of the position of the object 27. It should be understood that FIG. 10 represents an alternative embodiment of the present invention which operates in a manner similar to that described above in conjunction with FIG. 2, but with the implementation of the present invention being slightly different. FIG. 11 illustrates an alternative embodiment of the present invention in which the cross sectional areas of the first and second magnetic members are generally equal to each other and generally constant along their lengths, but in which the lengths of the first and second magnetic members differ from each other. The theory of operation of the embodiment of FIG. 11 is also slightly different than that of the several embodiments described above. A first sensor 120 is provided with a winding 122 as shown in FIG. 11. A second sensor 124 is provided with two windings 126 and 128. A first magnetic member 130 and a second magnetic member 132 are attached to an object 136 whose position is to be determined. As indicated by dimension D in FIG. 11, each of the winding positions and associated magnetic cores are generally identical in length. As described in detail above, it should be apparent that the impedances of the windings, 122, 126 and 128, can be measured as an indication of the amount of magnetic material disposed within the respective zones of the coils. As an illustration of this concept, it can be seen that winding 128 is virtually free of any magnetic material within its zone other than the possible slight effect of the end portion of the second magnetic member 132 which is slightly within the zone of winding 128. By comparison, it can be seen that the zone of winding 126 has the magnetic material of the second magnetic member 132 completely across its length. Similarly, winding 122 has the magnetic material of the first magnetic member 130 completely across its length. As the object 136 moves back and forth along the direction indicated by arrow A, the windings 126 and 128 of the second sensor 124 will experience changing impedances as a result of the presence or absence of magnetic material within their zones. By comparison, the reference sensor 120 will always have the magnetic material of the first magnetic member 130 within its zone. This results from the fact that the length of the first magnetic member 130 is provided to be long enough to always provide magnetic material within the zone of the first sensor 120 so that it can act as a reference according to the techniques described above.

Figure 12:
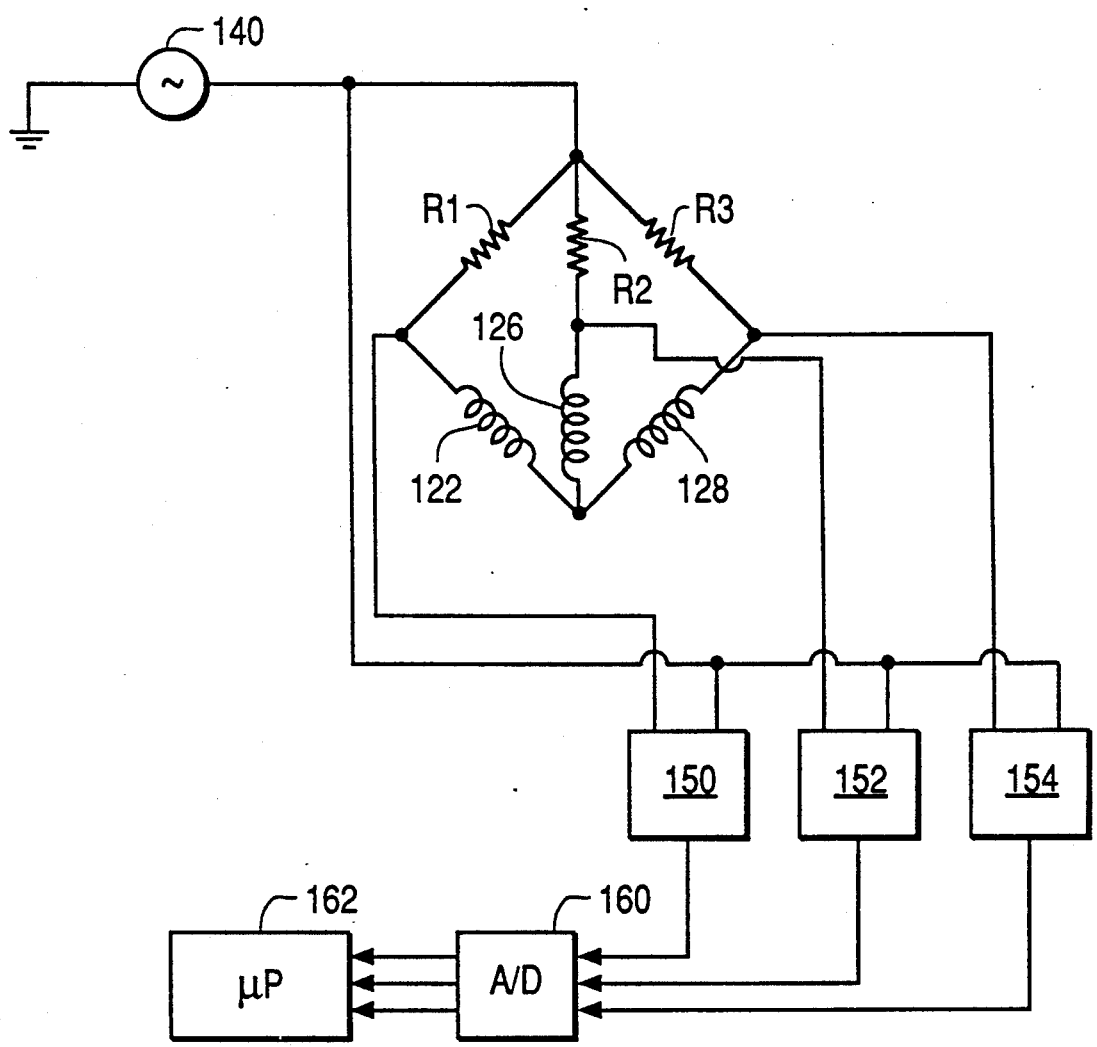
FIG. 12 illustrates an electrical circuit useable in association with the embodiment shown in FIG. 11.

The embodiment illustrated in FIG. 11 can be associated with the circuit shown in FIG. 12. An AC power supply 140 provides an alternating current which is permitted to flow selectively through resistors R1, R2 or R3, which are associated with windings 122, 126 and 128, respectively. Switch demodulators 150, 152 and 154 are associated with the current paths described above. By selectively measuring the voltage drops across the resistors in FIG. 12, the impedances of the windings can be determined. The measurements of the voltage drops are converted from analog to digital values by the analog-to-digital converter 160 and the digital results are compared by the microprocessor 162 to determine the position of the target, or object 136 in FIG. 11 according to the methodology described below. It should be clearly understood that many alternative circuit configurations, other than that shown in FIG. 12, can be used in accordance with the present invention illustrated in FIG. 11.

Figure 13:
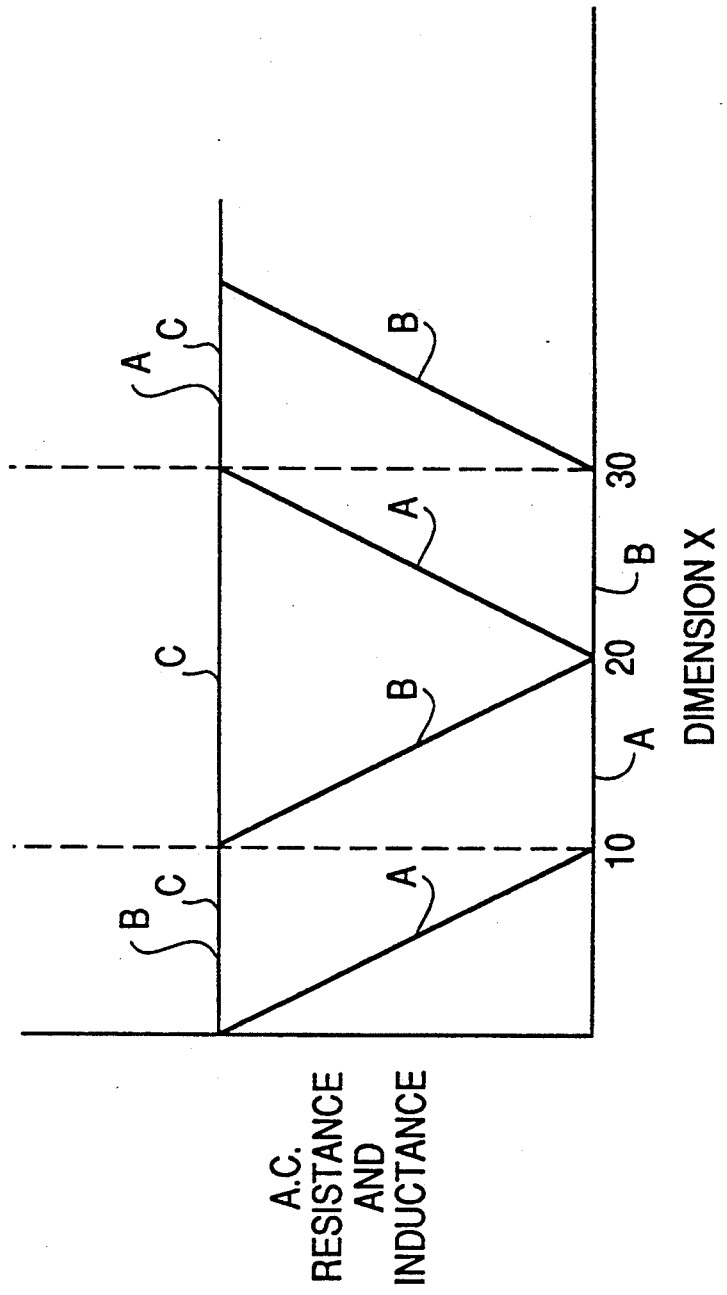
FIG. 13 shows a graphical representation which illustrates the relationship between AC resistance or inductance as a function of the position of the magnetic members illustrated in FIG. 11.

FIG. 13 shows a graphical representation of the values of impedances in the windings illustrated in FIG. 11. For purposes of comparison between FIGS. 11 and 13, reference letter A in FIG. 13 represents the sensor output from winding 128 in FIG. 11, reference letter B in FIG. 13 represents sensor output from winding 126 in FIG. 11 and reference letter C in FIG. 13 represents the sensor output from winding 122 in FIG. 11. As can be seen in FIG. 13, the value of reference letter C is generally constant. This results from the fact that winding 122 is the reference winding and is expected to be constant because of its continuous presence of magnetic material within its zone. As described in greater detail above, changes in gap G between the magnetic members and their sensors will have effects similar to those illustrated above. The description with relation to FIG. 13 will relate to circumstances in which the gap G is generally constant and is intended to describe the methodology for comparing the signals of windings 126 and 128. When the microprocessor 162, as illustrated in FIG. 12, received the digital values from the analog-to-digital converter 160, it compares the magnitudes of the A signal and the B signal to determine the value of dimension X which is illustrated in FIG. 11. The microprocessor also reviews the magnitude of signal C from winding 122 to determine whether or not circumstances have changed, such as an increase or decrease in gap G or a change in temperature. The microprocessor 162 then reviews a lookup table to determine the precise magnitude of dimension X.

Although the present invention has been described in detail with specific illustrations of several alternative embodiments, it should be clearly understood that many other embodiments are to be considered within its scope.

The embodiments of the invention in which an exclusive property or right is claimed are defined as follows:

1. Apparatus for determining the position of an object, comprising:
   a first sensor configured to provide a first signal responsive to the presence of a magnetic material proximate said first sensor;
   a second sensor configured to provide a second signal responsive to the presence of a magnetic material proximate said second sensor;
   a first magnetic member attached to said object, said first magnetic member having a first length defined along a first axis and a first cross sectional area, said first cross sectional area being generally perpendicular to said first axis; and
   a second magnetic member attached to said object, said second magnetic member having a second length defined along a second axis and a second cross sectional area, said second cross sectional area being generally perpendicular to said second axis, said first and second magnetic members being associated with said object to move along said first and second axes, respectively, in response to movement of said object, said first and second magnetic members being shaped to cause said first and second sensors to provide said first and second signals with relative magnitudes whose relationship is related to the position of said object.

2. The apparatus of claim 1, wherein:
said first sensor comprises a first magnetic coil and said second sensor comprises a second magnetic coil.

3. The apparatus of claim 1, wherein:
said first length is generally equal to said second length.

4. The apparatus of claim 1, wherein:
said first cross sectional area is generally constant at all positions along said first length.

5. The apparatus of claim 4, wherein:
said second cross sectional area varies as a function of linear position along said second length.

6. The apparatus of claim 1, wherein:
said first and second axes are generally straight and parallel to each other.

7. The apparatus of claim 1, wherein:
said first and second axes are both arcuate and concentric about a common point, said first and second axes being disposed to move about said common point in response to movement of said object.

8. The apparatus of claim 1, wherein:
a mathematical relationship between said first and second signals yields a unique value for each position of said object.

9. The apparatus of claim 8, wherein:
said mathematical relationship is defined by the equation where P represents said mathematical relationship, $$P = K_1 \times \left[ \frac{(S_V - S_0) - (S_{REF} - S_0)/K_2}{(S_{REF} - S_0) - (S_{REF} - S_0)/K_3} \right]$$

$S_V$ represents said second signal, $S_{REF}$ represents said first signal, $S_0$ represents a predetermined offset value, $K_1$ is a first constant, $K_2$ is a second constant and $K_3$ is a third constant.

10. An apparatus for determining the position of an object, comprising:
   first means for sensing the presence of magnetic material in a first zone proximate said first sensing means, said first sensing means being responsive to the quantity of said magnetic material in said first zone;
   second means for sensing the presence of magnetic material in a second zone proximate said second sensing means, said second sensing means being responsive to the quantity of said magnetic material in said second zone;
   first means for moving a first quantity of said magnetic material into said first zone, said first moving means being attached to said object, said first quantity being independent from the position of said object;
   second means for moving a second quantity of said magnetic material into said second zone, said second moving means being attached to said object, said second quantity being dependant on the position of said object;
   first means for determining a first magnitude representative of said first quantity, said first determining means being connected in electrical communication with said first sensing means;

second means for determining a second magnitude representative of said second quantity, said second determining means being connected in electrical communication with said second sensing means; and means for comparing said first and second magnitudes to determine the position of said object.

11. The apparatus of claim 10, wherein:

said first sensing means comprises a first magnetic coil; and said second sensing means comprises a second magnetic coil.

12. The apparatus of claim 11, wherein:

said first determining means comprises a first means for measuring a first electrical signal associated with said first magnetic coil; and said second determining means comprises a second means for measuring a second electrical signal associated with said second magnetic coil.

13. The apparatus of claim 12, wherein:

said first magnitude is determined as a function of said first electrical signal; and said second magnitude is determined as a function of said second electrical signal.

14. The apparatus of claim 13, wherein:

said comparing means comprises a third means for determining a third magnitude as a function of said first and second magnitudes.

15. The apparatus of claim 14, wherein:

said third magnitude is determined by the equation $$P = K_1 \times \left[ \frac{(S_V - S_0) - (S_{REF} - S_0)/K_2}{(S_{REF} - S_0) - (S_{REF} - S_0)/K_3} \right]$$

where P represents said third magnitude, $S_V$ represents said second magnitude, $S_{REF}$ represents said first magnitude, $S_0$ represents an offset value determined as a function of said apparatus, $K_1$ is a first constant, $K_2$ is a second constant and $K_3$ is a third constant.

16. The apparatus of claim 15, wherein:

said second and third constants are generally equal to each other.

17. The apparatus of claim 10, wherein:

said first moving means has a generally constant cross sectional area along its entire operative length, said operative length extending in a direction parallel to the direction of expected movement of said object; and said second moving means has a cross sectional area which varies as a function of position along its operative length, said operative length of said second moving means extending in a direction parallel to the direction of expected movement of said object.

18. The apparatus of claim 10, wherein:

said first and second moving means have generally equal cross sectional areas measured perpendicularly to their respective operative lengths; and said first and second moving means have measurably different operative lengths.

19. A method for determining the position of an object, comprising:

sensing the presence of magnetic material in a first zone;

sensing the presence of magnetic material in a second zone;

moving a first quantity of said magnetic material into said first zone, said first quantity being independent from the position of said object;

moving a second quantity of said magnetic material into said second zone, said second quantity being dependant on the position of said object;

determining a first magnitude representative of said first quantity;

determining a second magnitude representative of said second quantity; and comparing said first and second magnitudes to determine the position of said object.

20. An apparatus for determining the position of an object, comprising;

means for sensing the presence of magnetic material in a zone proximate said sensing means, said sensing means being responsive to the quantity of said magnetic material in said zone;

means for moving a quantity of said magnetic material into said zone, said moving means being attached to said object, said quantity being dependant on the position of said object;

means for determining a magnitude representative of said quantity, said determining means being connected in electrical communication with said sensing means; and means for comparing said magnitude to stored data to determine the position of said object.

* * * * *